United States Patent
Broyles et al.

(10) Patent No.: US 10,856,175 B1
(45) Date of Patent: Dec. 1, 2020

(54) METHOD AND SYSTEM FOR MANAGING CONGESTION IN INTER-BAND CARRIER AGGREGATION

(71) Applicant: Sprint Spectrum L.P., Overland Park, KS (US)

(72) Inventors: Daniel S. Broyles, Olathe, KS (US); Roger D. Bartlett, Merriam, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1007 days.

(21) Appl. No.: 14/828,298

(22) Filed: Aug. 17, 2015

(51) Int. Cl.
*H04W 28/02* (2009.01)
*H04W 72/04* (2009.01)

(52) U.S. Cl.
CPC ... *H04W 28/0289* (2013.01); *H04W 28/0284* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 6,490,452 B1 | 12/2002 | Boscovic et al. | |
| 8,761,824 B2 * | 6/2014 | Palanki | H04L 5/003 455/522 |
| 9,503,247 B2 * | 11/2016 | Panchal | H04W 72/0453 |
| 9,516,549 B1 * | 12/2016 | Aksu | H04W 28/08 |
| 10,581,577 B2 * | 3/2020 | Li | H04L 1/1887 |
| 2013/0208615 A1 * | 8/2013 | Ishikura | H04L 5/001 370/252 |
| 2013/0322370 A1 * | 12/2013 | Fong | H04W 72/048 370/329 |
| 2014/0185526 A1 * | 7/2014 | Aksu | H04W 4/001 370/328 |
| 2015/0341945 A1 * | 11/2015 | Panchal | H04L 5/003 370/329 |
| 2016/0249222 A1 * | 8/2016 | Li | H04W 16/14 |
| 2017/0150511 A1 * | 5/2017 | Chmiel | H04W 72/1205 |

* cited by examiner

*Primary Examiner* — Steve R Young (57) ABSTRACT

When a base station is serving a plurality of UEs, the base station detects that a load level on a first RF carrier is greater than a threshold load level. The base station then decides, based at least in part on whether a UE is capable of being served by the base station on a second RF carrier, whether to limit allocation of resource blocks on the first RF carrier to the UE. The base station may then establish or modify an air interface connection with the UE to encompass resource blocks on the first RF carrier and/or resources blocks on one or more other RF carriers, in accordance with the limited allocation.

20 Claims, 5 Drawing Sheets

Fig. 5

METHOD AND SYSTEM FOR MANAGING CONGESTION IN INTER-BAND CARRIER AGGREGATION

BACKGROUND

Unless otherwise indicated herein, the description in this section is not itself prior art to the claims and is not admitted to be prior art by inclusion in this section.

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more radio frequency (RF) carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as a pair of separate respective ranges of frequency, or time division duplex (TDD), in which the downlink and uplink channels are defined on a common range of frequency but distinguished from each other through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot or sub-frame into resource blocks. When a UE is positioned within coverage of a base station in such a system, the UE may register or "attach" with the base station on a particular carrier on which the base station is configured to provide service, and the base station may then serve the UE on that carrier, scheduling particular downlink and uplink resource blocks on that carrier to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In such an LTE system, for instance, when the base station has data to transmit to a UE, the base station may assign certain downlink resource blocks (and thus certain sub-carriers) in a given sub-frame for use to carry the data to the UE at a particular coding rate, and the base station may then (i) transmit to the UE in that sub-frame a downlink control information (DCI) message that specifies the assigned resource blocks and coding rate and (ii) encode and transmit the data to the UE in the assigned resource blocks in that sub-frame. Per the DCI message, the UE would then read the transmitted data from the assigned resource blocks. Likewise, when the UE has data to transmit to the base station and accordingly transmits a scheduling request to the base station, the base station may assign certain uplink resource blocks in a given sub-frame for use to carry the data from the UE at a particular coding rate and may transmit to the UE, in advance of that sub-frame, a DCI message that specifies the assigned resource blocks and coding rate. And the UE may then encode and transmit the data to the base station in the assigned resource blocks in that sub-frame.

With such an arrangement, the bandwidth of the carrier on which the base station serves a UE may pose an effective limit on the peak rate of data communication between the base station and the UE, as the bandwidth would define only a limited number of resource blocks per slot or sub-frame, with data rate per resource block being further limited based on air interface conditions.

One way to help overcome this per-carrier data rate limitation is to have a base station serve a UE on multiple carriers at once, providing what is known as "carrier aggregation" service. With carrier aggregation service, multiple carriers from either contiguous frequency bands or non-contiguous frequency bands (i.e., inter-band carrier aggregation) are aggregated together as "component carriers" to increase the overall bandwidth available per slot by providing a greater extent of air interface resources in which the base station can schedule uplink and downlink communication. With carrier aggregation, one of the carriers may be deemed to be a primary carrier or primary cell (PCell) and each other carrier may be deemed to be a secondary carrier or secondary cell (SCell).

Although serving a UE on multiple carriers concurrently can help improve throughput for the UE, doing so also necessarily makes use of more radio frequency spectrum than serving the UE on just one of the carriers at a time. In practice, the operator of a wireless communication system may have only a limited extent of radio frequency spectrum, such as a limited number of licensed carriers, available for use to serve UEs in a given market. Providing UEs with carrier aggregation service in such a system may thus consume more of that limited radio frequency spectrum than providing UEs with service on just one carrier at a time and may thereby leave less spectrum available to serve other UEs.

Overview

When a base station serves a UE with carrier aggregation, the base station may allocate resource blocks in one or more carriers to the UE based on capabilities of the UE (e.g., hardware capabilities), quality of the air interface connection between the base station and the UE (e.g., signal strength), and/or the type of content that will be communicated between the base station and the UE (e.g., a higher number of resource blocks could be allocated if the content is latency sensitive or substantial).

However, in some scenarios, the base station may serve one or more UEs that are capable of wireless communication over more carriers than other UEs within coverage of the base station. For instance, a UE may be incapable of using one or more of the base station's carriers due to the UE's hardware configuration (e.g., the UE might not include hardware configured for wireless communication using an available carrier radio frequency). Further, even if the UE includes suitable hardware, the UE may be incapable of both uplink and downlink communication over an available carrier frequency due to distance between the UE and the base station. By way of example, the base station may include hardware (e.g., high-power antennas) that allows the base station to provide downlink communication to a UE located at a given distance to the base station. Yet, at this distance, the UE may be unable to provide uplink communication to the base station using the same carrier because the UE has less powerful hardware (e.g., low-power antennas) than the base station. In these scenarios, a given carrier could become heavily loaded even though other carriers have available resource blocks that at least one of the UEs currently being served on the given carrier can use.

As a specific example of this, consider a scenario where a base station is configured to operate on three carriers, A, B, and C, where the base station is currently serving a first set of UEs and a second set of UEs on carrier A, where the first set of UEs are also capable of being served on carriers B and C, and where the second set of UEs are incapable of being served on carriers B and C. For instance, the second set of UEs might not include suitable hardware for wireless communication over carriers B and C. In this scenario, if the base station decides to increase bandwidth allocated to one or more of the second set of UEs, the base station will have to allocate the additional resource blocks on carrier A. As a result, carrier A could become heavily loaded even though carriers B and C have available resource blocks that the first set of UEs can use.

As another example, consider a variation of the previous scenario, where the base station decides to begin serving a given UE, and where the given UE is also incapable of being served on carriers B and C. For instance, the given UE might enter into coverage of the base station, request new service from the base station, or attempt to establish a new session with the base station. Like the previous scenario, the base station in this scenario will have to allocate resource blocks on carrier A to the given UE for the new service. And like the previous scenario as well, carrier A could become heavily loaded as a result, even though carriers B and C have available resource blocks that other UEs currently served by the base station can use.

Further, in the two previous scenarios, if carrier A is already heavily loaded, the base station might be unable to provide the new service or the increased bandwidth without affecting the service currently provided to other UEs on carrier A. Consequently, it would be desirable for a base station to reduce and/or avoid congestion (i.e., threshold high loading) of a carrier, particularly when one or more UEs currently being served on the carrier are capable of being served on another carrier, and when one or more other UEs are incapable of being served on the other carrier.

Disclosed herein is a method and system for doing so, based at least in part on determining capabilities of the various UEs served by the base station, and/or capabilities of UEs that are requesting new service from the base station. In particular, the disclosure provides for a base station detecting that a load level on a first carrier is threshold high, and determining that a UE currently being served on the first carrier is capable of being served on a second carrier. The disclosure then provides for limiting a number of resource blocks on the first carrier that are allocated (or available for allocation) to the UE at least until the load level on the first carrier becomes lower than a threshold load level. Instead, in one instance, the base station could allocate other resource blocks on the second carrier to the UE as replacement. Or, in another instance, the base station could temporarily reduce the total number of resource blocks allocated (or available for allocation) to the UE (i.e., at least while the load level on the first carrier is threshold high). Through this process, the base station could free resource blocks on the first carrier for serving other UEs that cannot use the second carrier.

Accordingly, in one respect, disclosed is a method operable by a base station that provides wireless communication service on a plurality of RF carriers, where each carrier defines a plurality of physical resource blocks for carrying data. In accordance with the disclosure, the method involves the base station serving a plurality of UEs including a first UE and a second UE. Further, the method involves the base station making a first determination that the first UE (i) is being served by the base station on the first RF carrier and (ii) is capable of being served by the base station on a second RF carrier. And the method involves the base station making a second determination that the second UE (i) is being served by the base station on the first RF carrier and (ii) is incapable of being served by the base station on the second RF carrier. While serving the plurality of UEs, the method then involves the base station detecting that a load level on a first RF carrier remains higher than a threshold load level for at least a threshold amount of time. In response to at least the detection, the first determination, and the second determination, the method then involves the base station reducing a number of resource blocks on the first RF carrier that are allocated to the first UE.

Further, in another respect, disclosed is a method operable by a base station that provides wireless communication service on a plurality of RF carriers, where each carrier defines a plurality of physical resource blocks for carrying data. In accordance with the disclosure, the method involves the base station serving a plurality of UEs. Further, the method involves the base station making a first determination that a UE (i) is capable of being served by the base station on a first RF carrier and (ii) is capable of being served by the base station on a second RF carrier. While serving the plurality of UEs, the method then involves the base station making a second determination that a load level on the first RF carrier is higher than a first threshold load level. Based at least on the first determination and the second determination, the method then involves the base station limiting allocation of resource blocks on the first RF carrier to the UE until the load level on the first RF carrier remains lower than a second threshold load level for at least a threshold amount of time.

Still further, in yet another respect, disclosed is a method operable by a base station that provides wireless communication service on a plurality of RF carriers, where each carrier defines a plurality of physical resource blocks for carrying data. In accordance with the disclosure, the method involves the base station serving a plurality of UEs including a first UE and a second UE. Further, the method involves the base station making a first determination that the first UE (i) is being served by the base station on the first RF carrier and (ii) is capable of being served by the base station on a second RF carrier. And the method involves the base station making a second determination that the second UE (i) is being served by the base station on the first RF carrier and (ii) is incapable of being served by the base station on the second RF carrier. While serving the plurality of UEs, the method then involves the base station detecting that a load level on a first RF carrier remains higher than a first threshold load level for at least a first threshold amount of time. In response to at least the detection, the first determination, and the second determination, the method then involves the base station limiting allocation of resource blocks on the first RF carrier to the first UE until the load level on the first RF carrier remains lower than a second threshold load level for at least a second threshold amount of time.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein mainly in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
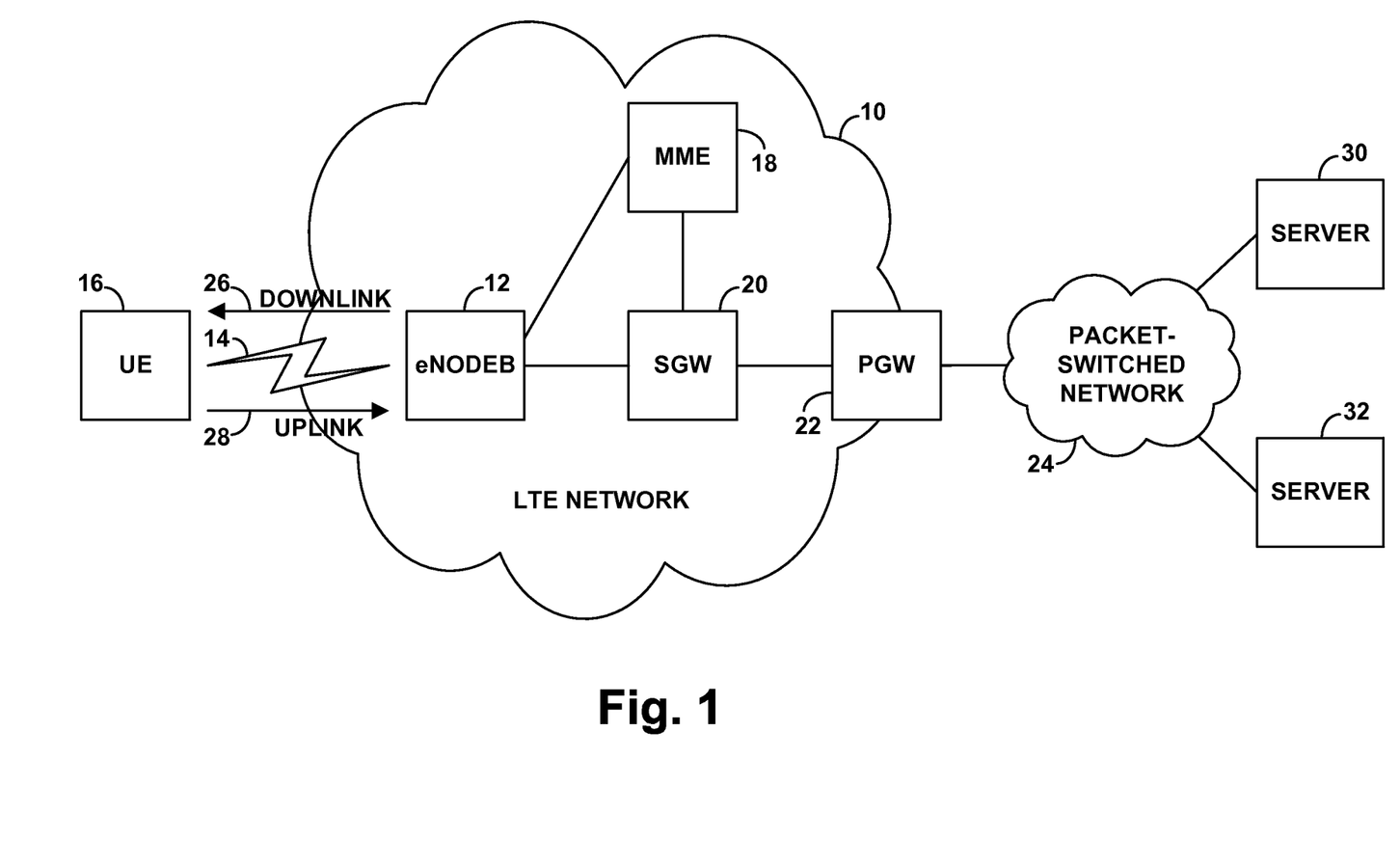
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes a base station (eNodeB) 12, which has an antenna structure and associated equipment for providing an LTE coverage area 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

As illustrated, the air interface of coverage area 14 defines a downlink direction 26 from the eNodeB to the UE and an uplink direction 28 from the UE to the eNodeB. Further, the eNodeB and UE may be configured (e.g., licensed and programmed) to support air interface communication on various particular carriers, each of which may be FDD or TDD. Each such carrier and/or its particular downlink and uplink channels may be identified by one or more globally unique identifiers per industry standard, so that the eNodeB and a served UE can refer to particular carriers by those identifiers.

According to LTE, each carrier's downlink channel may then define various sub-channels, such as a physical downlink control channel (PDCCH) for carrying scheduling directives and other control signaling from the eNodeB to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB and a physical uplink shared channel (PUSCH) for carrying scheduled uplink data communication.

With this arrangement, when UE 16 enters into coverage of eNodeB 12, the UE may detect the eNodeB's coverage on a particular carrier, and the UE may engage in an attach process or handover process to register with the LTE network on that carrier. For instance, the UE may initially transmit to the eNodeB an attach request, which the eNodeB may pass along to the MME 18, triggering a process of authenticating the UE and establishment of one or more logical bearer connections for the UE between the eNodeB and the PGW 22.

Further, the UE may engage in signaling with the eNodeB to establish a radio-link-layer connection (i.e., air interface connection) on the detected carrier, so that the eNodeB may then serve the UE on that carrier. For instance, the UE and eNodeB may exchange radio resource control (RRC) configuration messaging in order to prepare the eNodeB to serve the UE on the carrier and to prepare the UE to be served on the carrier. In this process, the eNodeB may store a context record for the UE, indicating that the eNodeB is serving the UE on the particular carrier, so that the eNodeB may then serve the UE on the indicated carrier (e.g., then exchanging control signaling and bearer traffic with the UE on that carrier) per that context record. Further, the UE may store a context record indicating that the UE is being served on that carrier, so that the UE can then be served on that carrier (e.g., then exchanging control signaling and bearer traffic with the eNodeB on that carrier) per that context record. As such, the radio-link-layer connection could be considered to effectively encompass initially just that one carrier.

In addition, during this initial attach process and/or more likely later while serving the UE, the eNodeB and UE may engage in RRC configuration messaging and/or other processing to modify or otherwise set the UE's radio-link-layer connection to encompass a different number of carriers. In particular, the eNodeB and UE may arrange the UE's radio-link-layer connection to encompass two or more carriers so as to facilitate carrier aggregation service.

There could be various reasons or triggers for doing this. By way of example, the eNodeB may determine that a single carrier on which the UE would be served or is being served, such as the carrier on which the UE initially requested attachment and/or initially attached with the eNodeB, is threshold heavily loaded (e.g., that the eNodeB has been scheduling more than a threshold percentage of resources on that carrier, and/or that the eNodeB is serving more than a threshold number of UEs with radio-link-layer connections encompassing that carrier). Or the eNodeB may determine that the air interface channel conditions between the UE and the eNodeB are threshold good and/or threshold poor (e.g., based on UE-provided channel-quality measurement reports and/or eNodeB evaluation of channel quality). Still further, the eNodeB may determine that there is a threshold great extent of data buffered for transmission over the air interface between the eNodeB and the UE. And still further, the eNodeB may determine that a particular type of content is going to be communicated between the eNodeB and the UE and that the type of content could benefit from added bandwidth.

To set or adjust the carriers encompassed by the UE's radio-link-layer connection, the eNodeB may transmit to the UE an RRC connection reconfiguration message that specifies the carriers on which the eNodeB will be serving the UE, identifying each carrier by its global identifier for instance. Further, to facilitate carrier aggregation service, the eNodeB may designate one such carrier by a special PCell index number (such as carrier index 0 (zero)) and the eNodeB may designate each other carrier by a special SCell index number (such as carrier index 1-7). The eNodeB may then also update its context record for the UE to indicate that the UE's radio-link-layer connection now encompasses the indicated carriers, so that the eNodeB may then engage in communication with the UE on those carriers. And the UE may responsively update its context record to indicate that the UE's radio-link-layer connection now encompasses the indicated carriers, so that the UE will be prepared to engage in communication with the eNodeB on those carriers.

This or another process could be used to add or remove one or more carriers from a UE's radio-link-layer connection and to thus reconfigure the radio-link-layer connection. For example, if the connection currently encompasses just one carrier, the process could be used to reconfigure the connection to encompass a different carrier and/or to add one or more additional carriers (e.g., as SCells) so as to facilitate carrier aggregation service. As another example, if the connection currently encompasses two or more carriers, the process could be used to add one or more additional carriers to the connection so as to provide increased carrier aggregation, or to remove one or more carriers from the connection so as to provide reduced carrier aggregation or to switch to single-carrier service. Other examples are possible as well.

Government regulations establish certain RF frequency bands, and wireless service providers may be licensed to operate on particular ones of those bands. In the LTE context, each FDD LTE frequency band defines a pair of discrete uplink and downlink frequency ranges, each of which can be divided into channels having bandwidths such as 1.4 MHz, 3 MHz, 5 MHz, 15 MHz, or 20 MHz. A wireless service provider licensed to use an FDD LTE band may then configure an eNodeB to operate on an FDD LTE carrier defined as a pair of such channels, such as a particular 5 MHz uplink channel and a particular 5 MHz downlink channel for example. Each TDD LTE frequency band, on the other hand, defines a single range of frequency, which can similarly be divided into channels having bandwidths such as those noted above. A wireless service provider licensed to use a TDD LTE band may then configure an eNodeB to operate on a TDD LTE carrier defined as a particular channel in that band, with uplink and downlink communications being time division multiplexed on that channel.

In a representative implementation of the present disclosure, a wireless service provider that operates eNodeB 12 may be licensed to operate on multiple LTE frequency bands, including one or more FDD LTE bands and one or more TDD LTE bands, and thus to provide service on multiple FDD LTE carriers and multiple TDD LTE carriers. With such an arrangement, the FDD carriers may be close in frequency to each other, the TDD carriers may be close in frequency to each other, and the FDD carriers may be distant in frequency from the TDD carriers. For example, but without limitation, the wireless service provider may be licensed to operate on FDD bands around 800 MHz and/or 1.9 GHz and on a TDD band around 2.5 GHz, in which case eNodeB 12 may be configured to operate on one or more FDD carriers around 800 MHz or 1.9 GHz and on one or more TDD carriers around 2.5 GHz. For the sake of discussion, the remainder of this disclosure will assume that each TDD carrier is 20 MHz wide and that each FDD uplink and downlink channel is 5 MHz wide. However, principles of this disclosure can extend to apply in other scenarios as well, such as where the carriers are in bands other than these, whether the carriers are close to each other in frequency or distant from each other in frequency, and where the carriers have different bandwidths than these.

In line with the discussion above, the present disclosure can address a scenario where an eNodeB is serving a UE over an RRC connection that encompasses at least a first carrier, and where the eNodeB detects that a load level on the first carrier exceeds a threshold load level. As discussed above, when the eNodeB detects that the load level on the first carrier exceeds the threshold load level, the eNodeB decides, based at least on whether the UE is capable of being served on a second carrier, whether to at least temporarily reduce a number of resource blocks allocated (or available for allocation) to the UE on the first carrier. Through this process, the eNodeB could serve other UEs on the first carrier, where the other UEs are incapable of using the second carrier available to the UE. Further, in some instances, the eNodeB could still serve the UE currently being served on the first carrier by allocating resource blocks for the UE on the potentially less loaded second carrier.

In practice, a wireless service provider may provide wireless service to multiple UEs having different hardware capabilities. By way of example, some UEs may include hardware configured to use FDD carriers but not TDD carriers, other UEs may include hardware configured to use TDD carriers but not FDD carriers, and still other UEs may include hardware configured to use both TDD carriers and FDD carriers. For instance, a UE such as an older generation cellular phone may be capable of connecting to carriers in the 800 MHz and/or 1.9 GHz frequency bands but not the 2.5 GHz frequency band. As another example, some UEs may include hardware configured to allow the UEs to receive carrier aggregation service using carriers in one frequency band (e.g., FDD carriers) but not carriers in another frequency band (e.g., TDD carriers), even if the UEs are capable of receiving other types of service (e.g., single carrier communication) using any of the available frequency bands. As yet another example, some UEs may include hardware configured to allow the UEs to receive carrier aggregation service using carriers from any one of the available frequency bands, but not a combination of carriers from different frequency bands (i.e., inter-band carrier aggregation). As still another example, some UEs may include hardware configured to allow the UEs to receive carrier aggregation service using uplink channels from one frequency band and downlink channels from another frequency band, while other UEs may only be capable of receiving carrier aggregation service using uplink channels and downlink channels in the same frequency band. Other examples are possible as well. Thus, as wireless communication technology continues to evolve, an eNodeB may serve a combination of UEs that have different hardware capabilities.

Even if a first UE and a second UE have similar hardware capabilities, the first UE may be incapable of being served on a given carrier, whereas the second UE may be capable of being served on the same given carrier. As a specific example of this, consider a scenario where the first UE is at a given distance to the eNodeB 12. By using a TDD carrier in the 2.5 GHz frequency band, the first UE in this scenario can receive downlink communication from the eNodeB due to the powerful antennas included in the eNodeB, but the first UE at this distance cannot provide uplink communication to the eNodeB using the same TDD carrier due to the less powerful antennas included in the first UE and the high path loss associated with the TDD carrier's high frequency (e.g., where the TDD carrier is in the 2.5 GHz frequency band). In this scenario, for instance, the first UE at this distance may alternatively use an FDD carrier for the uplink communication due to the lower path loss associated with the lower frequency of the FDD carrier (800 MHz or 1900 MHz). On the other hand, the second UE in this scenario could be at a lesser distance to the eNodeB than the first UE. Thus, the second UE in this scenario may be capable of using either the FDD carrier or the TDD carrier for both uplink communication and downlink communication with the eNodeB.

In the example arrangement, when the eNodeB is serving a plurality of UEs, and the eNodeB detects a threshold high load level on a first carrier, the eNodeB may then decide whether to reduce resource blocks allocated (or available for allocation) to any of the UEs served on the first carrier, based at least on a consideration of whether any of the respective UEs is capable of being served on another carrier.

For instance, the eNodeB in the example arrangement may determine that a first UE, currently served with one or more resource blocks on the first carrier, includes the required hardware for receiving service on the second carrier. The eNodeB may determine this, for instance, by sending a query to the first UE, examining configuration data sent by the first UE, or attempting to establish a connection with the first UE over the second carrier among other possibilities. Further, the eNodeB may also determine whether the first UE could use the second carrier at its current location. For instance, if the first UE is at or beyond the cell edge of the second carrier and thus in poor RF conditions for service on the second carrier, then the eNodeB may determine that the first UE is incapable of using the second carrier even if the required hardware is included in the first UE. On the other hand, if the UE is closer to the eNodeB and thus likely in better RF conditions for service on the second carrier, then the eNodeB may determine that the first UE is capable of using the second carrier. In this scenario, the eNodeB may then decide to reduce the number of resource blocks allocated to the first UE on the first carrier or prevent allocation of additional resource blocks to the first UE on the first carrier (e.g., beyond a threshold pre-determined number of resource blocks), at least until the load level on the first carrier becomes less than the threshold high load level.

Further, in the scenario where the eNodeB decides, based on capabilities of the first UE, to limit allocation of resource blocks on the first carrier to the first UE, the eNodeB could also condition that decision on whether the second carrier is less loaded than the first carrier. If the second carrier has a higher load level than the current load level on the first carrier, limiting allocation of resource blocks on the first carrier could further congest the second carrier if the eNodeB allocates replacement resource blocks on the second carrier to the first UE. Thus, for instance, the eNodeB may limit the allocation of resource blocks on the first carrier to the first UE based also on whether the load level on the second carrier is less than the load level on the first carrier.

As a variation of the scenarios above, the eNodeB could also condition the decision of limiting allocation of resources blocks on the first carrier to the first UE on whether a second UE currently being served by the eNodeB on the first carrier is incapable of being served on the first carrier. For instance, the eNodeB may identify the second UE as currently receiving service on the first carrier without the capability of being served on the second carrier. To anticipate the second UE's need for additional bandwidth at a later time, the eNodeB in this scenario may limit allocation of resource blocks on the first carrier to the first UE, thereby freeing resource blocks on the first carrier for potential use by the second UE at a later time. For instance, the eNodeB in this scenario may update its context record for the first UE to prevent allocation of resource blocks on the first carrier to the first UE beyond a limited extent of allocation. As a result, in this instance, other resource blocks on the first carrier (beyond the limited extent) remain available, if needed, for allocation to the second UE or any other UE that is incapable of being served on the second carrier.

As another variation of the scenarios above, the eNodeB may receive a request from the second UE for a new communication session that requires resource block allocation, and the eNodeB may trigger limiting the allocation of resource blocks on the first carrier to the first UE in response to receiving this request from the second UE. As noted above, since the second UE is incapable of using the second carrier, limiting the allocation on the first carrier to the first UE in response to the triggering request could free resource blocks on the first carrier that the second UE is capable of using.

Figure 2:
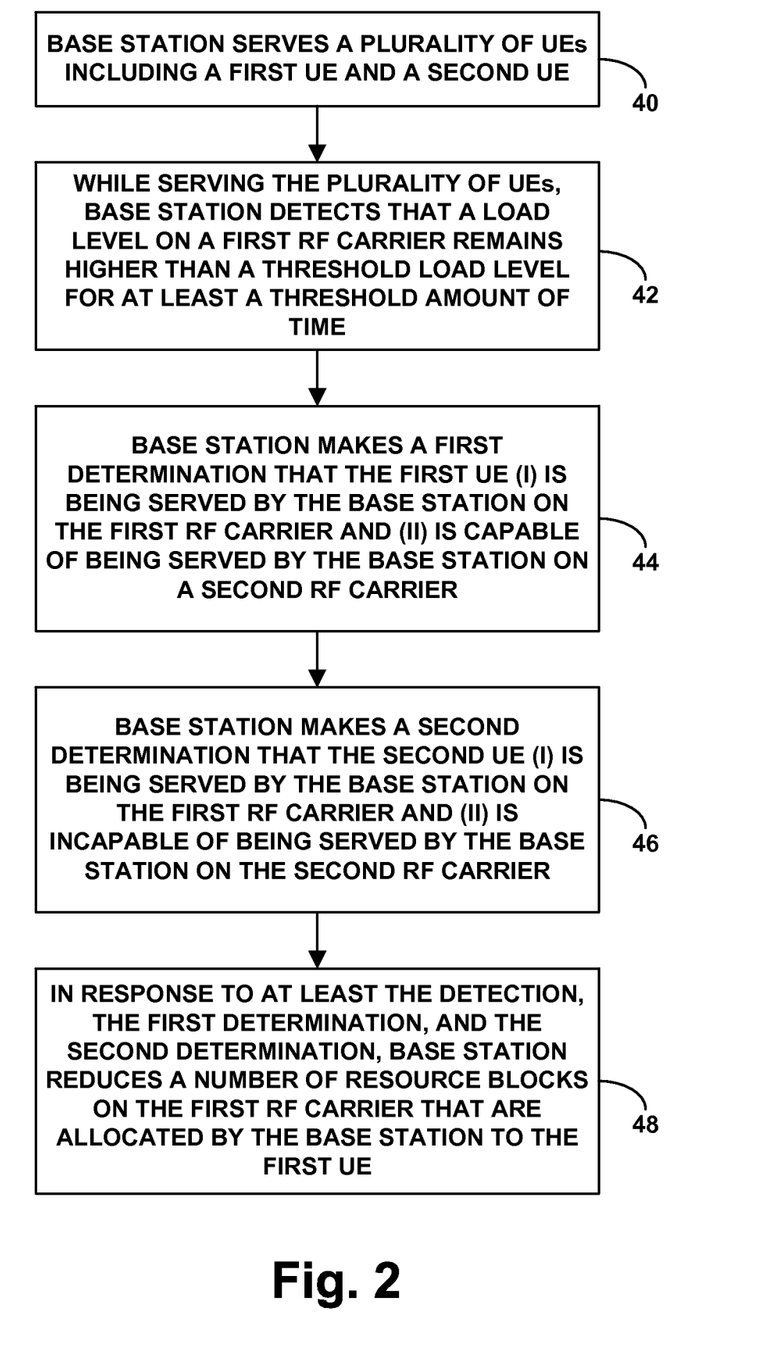
FIG. 2 is a flow chart depicting example operations in accordance with the disclosure.

FIG. 2 is next a flow chart depicting operations that can be carried out by a base station such as eNodeB 12 in accordance with the present disclosure, to help manage wireless communication service provided by the base station on a plurality of RF carriers, each carrier defining a plurality of physical resource blocks for carrying data. Although this flow chart depicts the operations in a particular sequence, the various depicted operations may occur concurrently with each other or perhaps in an order different from that shown.

As shown in FIG. 2, at block 40, the method involves the base station serving a plurality of UEs that include a first UE and a second UE. In this or other embodiments disclosed herein, the act of the base station serving a UE (or the plurality of UEs) may involve the base station having a radio-link layer connection (i.e., air-interface connection) with the UE on one or more of the plurality of RF carriers so that the base station and the UE can exchange signaling and bearer traffic with each other on the respective RF carrier(s). In LTE, for instance, the plurality of RF carriers may include a carrier on which the UE is attached with the eNodeB and that is thus the carrier encompassed by the UE's RRC connection.

At block 42, the method further involves, during the serving, the base station detecting that a load level on a first RF carrier of the plurality of RF carriers remains higher than a threshold load level for at least a threshold amount of time.

The act of the base station detecting that the load level remains higher than the threshold load level may amount to the base station encountering a trigger that indicates the threshold high level. For instance, the base station may detect this in response to determining that there is a threshold extent of data buffered for transmission on the first carrier between the base station and one or more of the plurality of UEs currently being served on the first carrier (e.g., the first UE). In another instance, the base station may detect this in response to detecting particular channel conditions on the first carrier.

As to the threshold load level and the threshold amount of time, the thresholds could be any values defined and programmed in the base station. For instance, the base station may wait for detecting that the load level remains high for at least the threshold amount of time, to avoid unnecessarily limiting allocation of resource blocks when temporary spikes in load level are detected rather than prolonged high load levels. Thus, the threshold amount of time may be any reasonable amount of time for such purpose or some other purpose.

At block 44, the method involves the base station making a first determination that the first UE (i) is being served by the base station on the first RF carrier and (ii) is capable of being served by the base station on a second RF carrier of the plurality of RF carriers. At block 46, the method further involves the base station making a second determination that the second UE (i) is being served by the base station on the first RF carrier and (ii) is incapable of being served by the base station on the second RF carrier.

The act of the base station determining that a UE is being served by the base station on the first RF carrier may involve examining records of the plurality of UEs currently being served, and identifying a subset of the plurality of UEs including the first UE and the second UE that are currently being served on the first RF carrier. By way of example, the base station may examine the RRC connection parameters of the plurality of UEs to identify the subset of UEs that have an RRC connection that encompasses one or more resource blocks on the first RF carrier. By way of another example, the base station may examine the data buffered for transmission on the first RF carrier to identify the destination UEs for the buffered data. Other examples are possible as well.

The act of the base station determining whether a UE is capable of being served on a carrier may involve the base station evaluating various factors. Example factors discussed above, such as hardware capabilities of the respective UEs, may apply here.

By way of example, the base station may determine hardware capabilities of the first UE and the second UE. If the first UE includes hardware, such as antennas and circuitry, that is suitable for wireless communication over the second RF carrier, the base station may deem the first UE as potentially capable of being served on the second RF carrier. On the other hand, if the second UE does not include similar hardware, the base station may deem the second UE as incapable of being served on the second RF carrier.

As a specific example of this, the base station in some embodiments may be configured to provide the wireless communication service on at least two non-contiguous frequency bands, such as the 800 MHz, 1.9 GHz, and 2.5 GHz frequency bands in the example arrangement above. Further, in these embodiments, the first RF carrier could be in a first frequency band of the at least two non-contiguous frequency bands, and the second RF carrier could be in a second frequency band of the at least two non-contiguous frequency bands. For instance, the first RF carrier may be in the 800 MHz first frequency band, and the second RF carrier may be in the 2.5 GHz second frequency band. Accordingly, in these embodiments, the act of making the second determination may involve the base station determining that the second UE does not include hardware configured for wireless communication over the second frequency band. For instance, the second UE may be an older generation cellular device that includes hardware (e.g., circuitry, antenna, etc.) configured for using the 800 MHz first frequency band, but does not include hardware configured for using the 2.5 GHz second frequency band.

The hardware capabilities may be indicated, for instance, in setup signaling logs stored in the base station for the first UE and the second UE. In one instance, a UE may include identification data in the setup signaling that identifies the UE as a particular generation device that is associated with particular hardware capabilities. In another instance, the setup signaling may indicate a QoS level of the UE's bearer connection, and the base station may deduce the minimal hardware capabilities that are associated with that QoS level. Or the UE may report its hardware capabilities to the base station (e.g., in response to a query from the base station). Other examples are possible as well.

In some embodiments, even if both the first UE and the second UE include suitable hardware, the base station's determination of whether a UE is capable of being served on the second RF carrier could be additionally conditioned on whether a location of the UE relative to the base station is suitable for wireless communication over the second RF carrier. For instance, a path loss associated with the second RF carrier may affect an extent of the range of wireless coverage available using the second RF carrier. As discussed above, the path loss of a carrier may depend on the frequency of the carrier. Thus, if the second RF carrier is at a higher frequency (e.g., TDD carrier in the 2.5 GHz frequency band, etc.), the second RF carrier may have a higher path loss than if it was instead at a lower frequency (e.g., FDD carrier in the 800 MHz frequency band, etc.). In one instance, the base station may receive (e.g., may have recently received) one or more reports from the UE indicating the location of the UE (e.g., using geographic location sensors in the UE). In this instance, the base station may also determine its own location (e.g., using geographic location sensors in the base station). And the base station in this instance may then determine distance between the UE and the base station based on this information. If a first distance between the base station and the first UE is less than a cell range associated with the path loss of the second RF carrier, the base station may deem the first UE capable of being served on the second RF carrier. On the other hand, if a second distance between the base station and the second UE is greater than the expected range, the base station may deem the second UE incapable of being served on the second RF carrier.

Additionally or alternatively, as a variation of the example above, the act of determining whether distance between a UE relative to the base station is suitable for wireless communication over the second RF carrier may be based at least in part on a measure of RF performance of communication between the base station and the UE on the first RF carrier. And the base station may then decide whether the UE is capable of being served on the second RF carrier based on a comparison between a path loss associated with the first RF carrier and a projected (or actual) path loss associated with the second RF carrier.

As a specific example of this, the base station could project (estimate) the UE's path loss on the second RF carrier based on a measure of the UE's path loss on the serving first RF carrier, and based also on the difference in frequencies between the serving first RF carrier and the second RF carrier. For instance, the base station may first determine the path loss on the serving first RF carrier as the difference between the base station's transmission reference signal power and the reference signal receive power reported by the UE to the base station. And the base station may apply a standard propagation model based on lambda and distance, where lambda is related to the carrier frequency (e.g., lambda=c/f, where c=3×10^8 m/s, and where f=1900×10^6 Hz for an FDD carrier at 1.9 MHz, or f=2500×10^6 Hz for a TDD carrier at 2.5 GHz), and distance is determined by UE location that is estimated based on path loss on the serving first RF carrier, to project path loss on the second RF carrier. The base station may then determine if the projected path loss, at this estimated distance, is sufficiently greater than the path loss on the first RF carrier, and (i) if so, then the base station may deem the UE incapable of being served on the second RF carrier but (ii) if not, then instead the base station may deem the UE capable of being served on the second RF carrier.

In practice, the base station may determine this RF performance on the first RF carrier for the downlink and/or the uplink. As to the downlink, for instance, the base station may receive (e.g., may have recently received) one or more reports from a UE of reference signal receive power (RSRP), reference signal receive quality (RSRP), channel state information (CSI), and/or other reports that indicate RF channel condition of the downlink on the first RF carrier (based on evaluation of downlink reference signal from the base station for instance), and the base station may roll up multiple recent such measures to establish a representative measure. As to the uplink, for instance, the base station may evaluate a sounding reference signal or other uplink communication from the UE to determine a measure of RF channel condition of the uplink, and the base station may similarly roll up multiple recent such measures to establish a representative measure. Other measures of RF performance on the first RF carrier are possible as well.

The base station may then determine whether the determined measure of RF performance of communication between the base station and the UE on the first RF carrier is below a defined threshold (e.g., a threshold defined by being programmed into the base station). For instance, the threshold could be a particular level of RSRP, RSRQ, or CSI, below which the RF condition is deemed to be poor.

And the base station may then decide based on that determination whether the first and/or second UE is capable of being served on the second RF carrier as well as the first RF carrier. For instance, if the base station determines that the measure of RF performance of communication between the base station and the first UE on the first RF carrier is not below the defined threshold, then, based at least in part on that determination, the base station may decide that the first UE is potentially capable of being served on the second RF carrier as well as the first RF carrier. Whereas, if the base station determines that the measure of RF performance of communication between the base station and the second UE on the first RF carrier is below the defined threshold, then, based at least in part on that determination, the base station may decide that the second UE is incapable of being served on the second RF carrier due to the higher path loss (and associated reduction in RF performance) of the second RF carrier as compared to the first RF carrier.

In some scenarios, a UE may experience a different RF performance for uplink communication compared to downlink communication. For instance, at a given distance, the second UE may be capable of receiving downlink data from the base station on the second RF carrier due to hardware capabilities of the base station, such as high power antennas. Yet, at this same distance, the second UE may be incapable of providing uplink data to the base station using the same second RF carrier due to the less powerful hardware capabilities of the second UE. Accordingly, in some embodiments, the act of making the second determination that the second UE is incapable of being served by the base station on the second RF carrier may be based on determining that the second UE is incapable of providing uplink data to the base station on the second RF carrier, even if the second UE is capable of receiving downlink data from the base station on the second RF carrier. In this situation, for instance, the first RF carrier might be the only carrier that the second UE can use for providing its uplink data to the base station, and may thus become congested quickly, even though the first UE is capable of providing its uplink data on either the first RF carrier or the second RF carrier. As discussed above, in some instances, determining that the second UE is incapable of providing the uplink data may be based on the location of the second UE relative to the base station, and the path loss associated with the second RF carrier.

Further, in some embodiments, the act of the base station making the determination of whether a UE is capable of being served on the second RF carrier is additionally conditioned on whether the UE is capable of being served with a particular type of service. For instance, if the base station determines that the first UE is capable of receiving inter-band carrier aggregation service that includes aggregation of component carrier in at least two non-contiguous frequency bands, and the second RF carrier in one of the at least two non-contiguous frequency bands, then the base station may deem the first UE capable of being served on the second RF carrier. On the other hand, if the base station determines that the second UE is incapable of receiving inter-band carrier aggregation service that includes aggregation of the second RF carrier as a component carrier, then the base station may deem the second UE incapable of being served on the second RF carrier. The reasons for whether a UE is capable of receiving inter-band carrier aggregation service may be similar to reasons for whether a UE is capable of being served on a particular RF carrier in general discussed above. In one instance, the second UE may not include hardware configured for using carrier aggregation service at all. Or the second UE may not include hardware configured for using inter-band carrier aggregation service, even if the second UE includes hardware that allows using single-band carrier aggregation service. In another instance, the location of the second UE may not allow inter-band carrier aggregation that includes the second RF carrier, where the second RF carrier is in a higher frequency band associated with a higher path loss in line with the discussion above.

As a variation of the example above, consider a scenario where the second UE is capable of receiving carrier aggregation service over the first frequency band of the first RF carrier, but not the second frequency band of the second RF carrier. Similarly, in this scenario, if the base station decides to provide the second UE with carrier aggregation service, it cannot use the second RF carrier as a component carrier, and thus the first RF carrier may become quickly congested, even though the first UE can use either the first RF carrier or the second RF carrier. Accordingly, in some embodiments, the base station's second determination may involve determining that the second UE (i) is capable of receiving carrier aggregation service that includes aggregation of component carriers in the first frequency band and (ii) is incapable of receiving carrier aggregation service that includes aggregation of component carriers in the second frequency band.

At block 48, the method then involves the base station, responsive to at least the detecting, the first determination, and the second determination, reducing a number of resource blocks on the first RF carrier that are allocated by the base station to the first UE.

In some instances, the act of reducing the number of resource blocks may involve the base station setting itself to not allocate more than a particular extent of resource blocks on the first RF carrier per unit time (e.g., per sub-frame) to the first UE. For instance, the base station could set itself to limit the first UE to allocation of at most a particular percentage of the resource blocks defined on the first RF carrier per unit time, among other possibilities. Further, this may involve the base station updating its context record for the first UE so that the base station would be prepared to provide the first UE with data communication using the channels associated with the reduced number of resource blocks on the first RF carrier.

In some embodiments, the act of reducing the number of resource blocks could also be in response to a trigger. Particularly, in addition to detecting the high load level on the first RF carrier, and making the first and second determinations, the additional trigger in these embodiments may involve the base station making a decision to begin serving the second UE with additional bandwidth. For instance, the base station may decide that it should serve the second UE with carrier aggregation service to provide the additional bandwidth (e.g., additional resource blocks) to the second UE. In this situation, if the second UE is incapable of using the second RF carrier for the additional resource blocks, the base station may have to use the first RF carrier instead, thereby adding to the high load level of the first RF carrier. Thus, reducing the resource block allocation on the first RF carrier to the first UE in this situation may alleviate congestion of the first RF carrier, especially if the first UE could instead use resource blocks on the second RF carrier to make up for the reduced allocation on the first RF carrier.

In some scenarios, the base station may decide to allocate additional resource blocks to the first UE after the reduction of the allocation of resource blocks on the first RF carrier at block 48. As an example of this, consider a scenario where the base station is serving the first UE with carrier aggregation. For instance, the first UE may already be receiving carrier aggregation service from the base station before the reduction of resource block allocation, or the base station may decide to begin serving the first UE with the carrier aggregation after the reduction to the resource blocks allocated to the first UE on the first RF carrier. Further, the number of resource blocks allocated by the base station to the first UE for the carrier aggregation service may vary over time depending on several factors, such as the type of content shared between the base station and the UE (e.g., video communication may need higher bandwidth allocation), and/or the RF performance of individual component carriers, among other possibilities.

And if the base station, at a later time, decides to provide additional bandwidth to the first UE for the carrier aggregation service by allocating additional resource blocks on the first RF carrier, where the first RF carrier is still threshold high loaded, then the first RF carrier could become re-congested. To avoid this re-congestion, for instance, the base station may continue to reduce the number of resource blocks on the first RF carrier that are allocated to the first UE, at least until the load level on the first RF carrier becomes lower than a threshold. Accordingly, in some embodiments, the method may also involve, after reducing the number of resource blocks on the first RF carrier that are allocated to the first UE, preventing the base station from allocating additional resource blocks on the first RF carrier to the first UE (e.g., for the carrier aggregation service) at least until the load level on the first RF carrier remains lower than a given threshold load level for at least a given amount of time.

Further, by waiting for the given amount of time before stopping the prevention of resource block allocation, the base station may avoid stopping the prevention if the load level on the first RF carrier experiences a downward spike rather than a sustained lower load level. Further, in some embodiments, the threshold load levels and/or waiting times for beginning the reduction of the allocation at block 48 and for preventing the allocation of additional resource blocks in this embodiment may be different. For instance, a lower given threshold load level could be used to trigger stopping the prevention of allocation, and a higher threshold load level could be used to trigger the reduction of the allocation at block 48. However, in other embodiments, the same threshold load levels and/or waiting times could be used for both beginning the reduction of the allocation at block 48 and for preventing the allocation of additional resource blocks described above.

Figure 3:
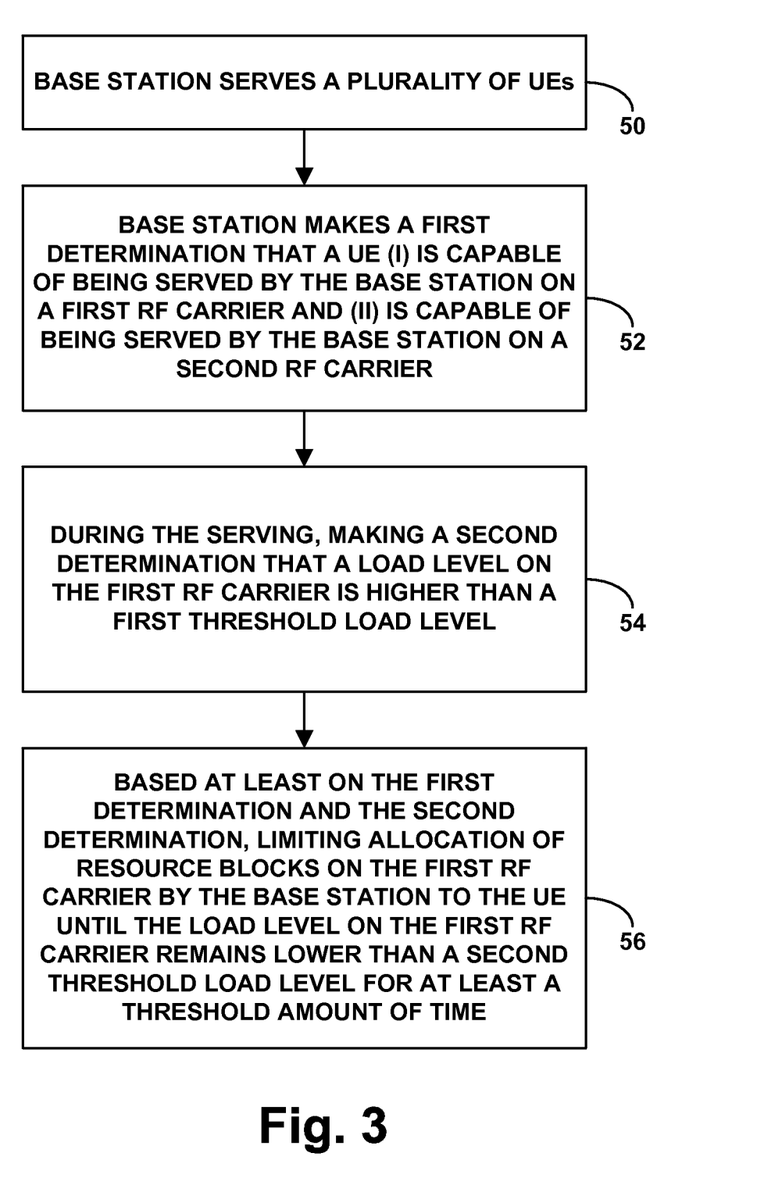
FIG. 3 is another flow chart depicting example operations in accordance with the disclosure.

FIG. 3 is next another flow chart depicting operations that can be carried out by a base station such as eNodeB 12 in accordance with the present disclosure, to help manage communication between the base station and a UE. In line with the discussion above, the base station may be configured to provide wireless communication service on a plurality of RF carriers, each carrier defining a plurality of physical resource blocks for carrying data. Although this flow chart depicts the operations in a particular sequence, the various depicted operations may occur concurrently with each other or perhaps in an order different from that shown.

As shown in FIG. 3, at block 50, the method involves the base station serving a plurality of UEs. At block 52, the method further involves the base station making a first determination that a UE (i) is capable of being served by the base station on a first RF carrier and (ii) is capable of being served by the base station on a second RF carrier.

Various features discussed above in connection with the flow chart of FIG. 2 may apply here as well. For instance, the act of the base station determining whether the UE is capable of being served on a carrier may be based on hardware configuration of the UE, distance between the UE and the base station, path loss associated with the carrier, a type of the service that could be provided to the UE (e.g., carrier aggregation service, inter-band carrier aggregation service, voice call service, text service, data transmission service, etc.), and so on.

In some embodiments, like the first and second UEs of FIG. 2, the UE in this method is one of the plurality of UEs currently being served by the base station. However, in other embodiments, the UE is not one of the plurality of UEs currently being served by the base station. For instance, the UE may request a new session with the base station, and the base station may perform this method in response to such request. In another instance, the base station may anticipate the UE requesting service based on a previous pattern of service provided by the base station to the UE at an earlier time. In yet another instance, the base station may anticipate the UE requesting the service based on information received from a neighboring base station that indicates that the UE is about to enter into coverage of the base station. Other examples are possible as well. Further, even if the UE is currently being served by the base station, unlike the first and second UEs of FIG. 2, the UE in some embodiments of this method may be currently served on an RF carrier other than the first RF carrier and the second RF carrier.

In instances where the UE is not currently being served by the base station on the first RF carrier, the base station's act of making the first determination may involve one or more determinations. By way of example, the base station may process previously stored records of communication between the base station and the UE, process setup signaling currently or recently performed between the base station and the UE, retrieve information pertaining to the UE from another base station or other component of the wireless communication system (e.g., the SGW 20, the MME 18, the PGW 22), and/or retrieve information pertaining to the UE from a remote server (e.g., servers 30, 32), among other possibilities.

At block 54, the method further involves, during the serving, making a second determination that a load level on the first RF carrier is higher than a first threshold load level, similarly to the detection of the threshold high load level at block 42 of FIG. 2. At block 56, the method further involves, based at least on the first determination and the second determination, limiting allocation of resource blocks on the first RF carrier by the base station to the UE until the load level on the first RF carrier remains lower than a second threshold load level for at least a threshold amount of time.

As discussed above, in some embodiments, the first threshold load level and the second threshold load level could be the same threshold load level. However, in other embodiments, the first threshold load level and the second threshold load level could be different load levels. For instance, a higher first threshold load level could be used to trigger making the second determination that the first RF carrier is threshold high loaded, and a lower second threshold load level could be used to trigger allowing the base station to stop limiting the allocation of resource blocks to the UE. Further, the base station may be configured to stop limiting the allocation of resource blocks either (i) in response to passage of the threshold amount of time or (ii) in response to an additional trigger as well as the passage of the threshold amount of time. The additional trigger, for instance, may include the base station deciding to allocate additional resource blocks to the UE after the passage of the threshold amount of time.

Accordingly, in some embodiments, the method may also involve the base station making a decision to begin allocating one or more resource blocks on at least one of the plurality of RF carriers to the UE. The act of the base station deciding to begin allocating the one or more resource blocks may involve various determinations. For instance, making the decision may involve the base station determining, based at least in part on a type of content that will be transmitted between the base station and the UE, that additional resource blocks should be added to the air interface connection between the base station and the UE. As a specific example of this, consider a scenario where the base station is serving the UE with carrier aggregation service. In the scenario, the base station may detect that the UE is receiving a video stream that requires higher bandwidth to improve the quality of service to the UE, and may thereby decide to allocate the additional resource blocks. In another instance, making the decision may involve the base station receiving a request from the UE to establish a new session. As a specific example of this, consider a scenario where the UE enters wireless coverage of the base station and requests establishing a new session. In these embodiments, the act of limiting the allocation of resource blocks at block 56 could be additionally conditioned on the decision to begin allocating the one or more resource blocks to the UE.

Even if the load level on the first RF carrier is just moderately high and not critically high, the base station may still decide to limit the allocation of resource blocks on the first RF carrier to the UE, since the UE is capable of being served on the second RF carrier as well as the first RF carrier. For instance, the act of limiting the allocation to the UE may involve the base station updating its context record for the UE to indicate a limitation on the extent of resource blocks on the first RF carrier that should be allocated to the UE. By setting this limitation, more resource blocks on the first RF carrier would remain available for allocation to other UEs. For instance, if the base station decides, while the limitation is in place, to allocate resource blocks to another UE, where the other UE is incapable of being served on the second RF carrier, and where the other UE is capable of being served on the first RF carrier, then the base station could allocate the available resource blocks on the first RF carrier to the other UE.

Thus, in some embodiments, the act of limiting allocation of resource blocks on the first RF carrier to the UE may just involve reducing a number of resource blocks on the first RF carrier allocated to the UE, in line with the discussion above. For instance, where the load level on the first RF carrier is moderately high, the base station could update its context record for the UE to allow allocation of no more than a particular number of resource blocks on the first RF carrier to the UE, at least while the load level on the first RF carrier is threshold high, or until the load level on the first RF carrier remains lower than the second threshold load level for a threshold amount of time.

Alternatively, in other embodiments, the act of limiting allocation of resource blocks on the first RF carrier to the UE may involve preventing allocation of resource blocks on the first RF carrier by the base station to the UE until the load level on the first RF carrier remains lower than the second threshold load level for at least the threshold amount of time. For instance, where the load level on the first RF carrier is critically high, the base station may temporarily prevent allocation of any resource blocks on the first RF carrier to the UE until the first RF carrier becomes less loaded (e.g., less than the second threshold load level).

Further, in line with the discussion above, some embodiments of this method may also involve making a third determination that another UE of the plurality of UEs (i) is capable of being served by the base station on the first RF carrier and (ii) is incapable of being served by the base station on the second RF carrier. Similarly to the UE, the other UE may be one of the plurality of UEs currently being served by the base station, or the other UE might not be currently served by the base station (e.g., the other UE may be requesting a new session, or a request is expected from the other UE at a later time, etc.). And the base station in these embodiments may limit the allocation of resource blocks on the first RF carrier to the UE based also on the third determination.

Figure 4:
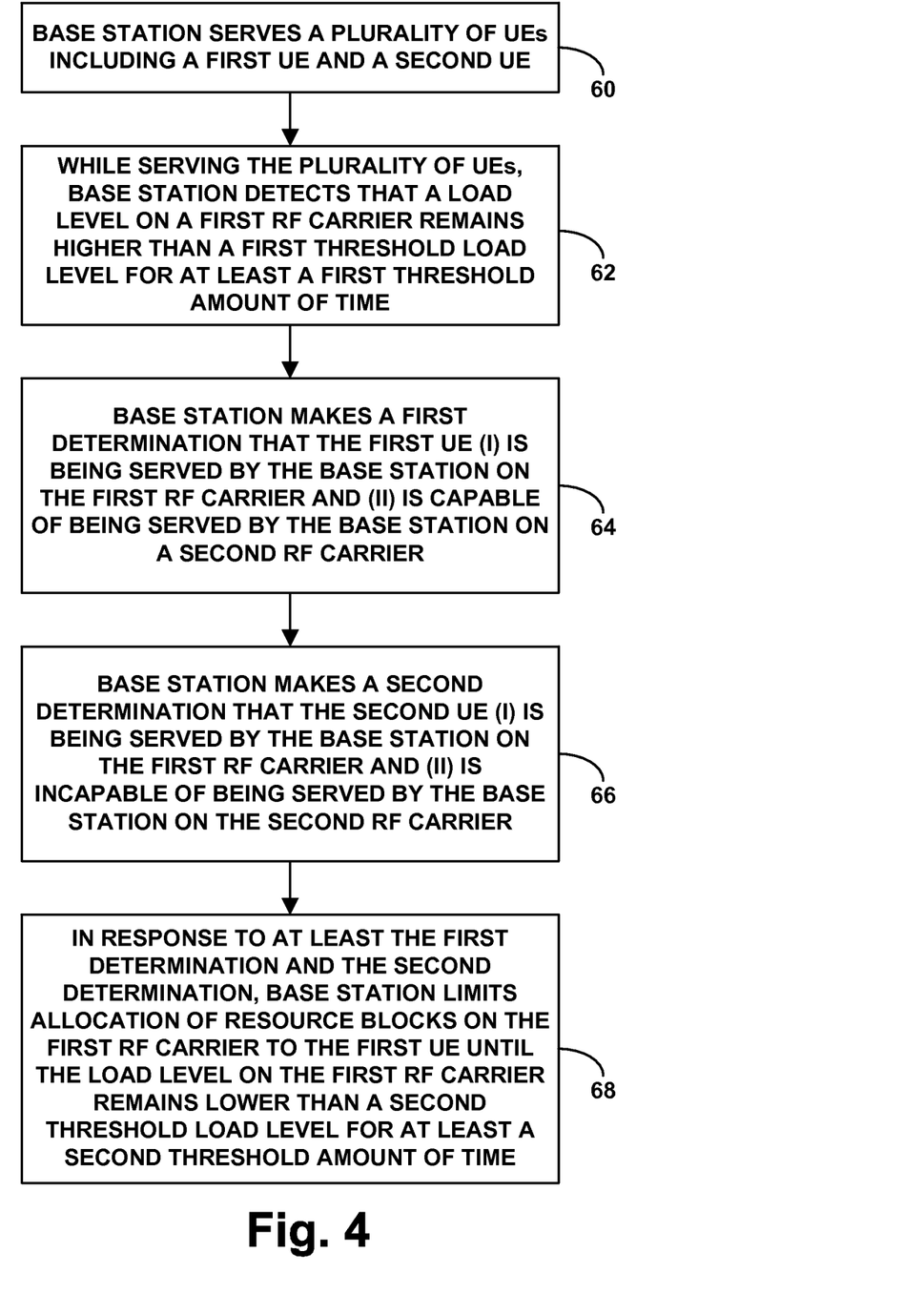
FIG. 4 is yet another flow chart depicting example operations in accordance with the disclosure.

FIG. 4 is next another flow chart depicting operations that can be carried out by a base station such as eNodeB 12 in accordance with the present disclosure, to help manage communication between the base station and a UE. In line with the discussion above, the base station may be configured to provide wireless communication service on a plurality of RF carriers, each carrier defining a plurality of physical resource blocks for carrying data. Although this flow chart depicts the operations in a particular sequence, the various depicted operations may occur concurrently with each other or perhaps in an order different from that shown.

As shown in FIG. 4, at block 60, the method involves the base station serving a plurality of UEs including a first UE and a second UE. At block 62, the method then involves, during the serving, the base station detecting that a load level on a first RF carrier of the plurality of RF carriers remains higher than a first threshold load level for at least a first threshold amount of time. At block 64, the method further involves the base station making a first determination that the first UE (i) is being served by the base station on the first RF carrier and (ii) is capable of being served by the base station on a second RF carrier of the plurality of RF carriers. At block 66, the method further involves the base station making a second determination that the second UE (i) is being served by the base station on the first RF carrier and (ii) is incapable of being served by the base station on the second RF carrier. At block 68, the method then further involves, responsive to at least the first determination and the second determination, the base station limiting allocation of resource blocks on the first RF carrier to the first UE until the load level on the first RF carrier remains lower than a second threshold load level for at least a second threshold amount of time.

Various features discussed above in connection with the flow charts of FIG. 2 and FIG. 3 may apply here as well. For instance, the act of the base station determining whether the UE is capable of being served on a carrier may be based on hardware configuration of the UE, distance between the UE and the base station, path loss associated with the carrier, a type of the service that could be provided to the UE (e.g., carrier aggregation service, inter-band carrier aggregation service, voice call service, text service, data transmission service, etc.), and so on. Further, for instance, the first threshold load level and the second threshold level may be a same threshold load level, or may be different threshold load levels. And, for instance, the first threshold amount of time and the second threshold amount of time may also be same or different.

In some embodiments, the act of the base station limiting the allocation of the resource blocks may involve the base station reducing a number of resource blocks on the first RF carrier that are available for allocation by the base station to the first UE, in line with the discussion above. In these embodiments, the method may also involve the base station modifying an air interface connection between the base station and the first UE according to the reduced number of resource blocks on the first RF carrier that are available for allocation by the base station to the first UE. For instance, if the base station is currently serving the first UE with more resource blocks on the first RF carrier than the reduced number of resource blocks at block 68, then the base station may modify the air interface connection to use a lower number of resource blocks on the first RF carrier for serving the first UE.

Figure 5:
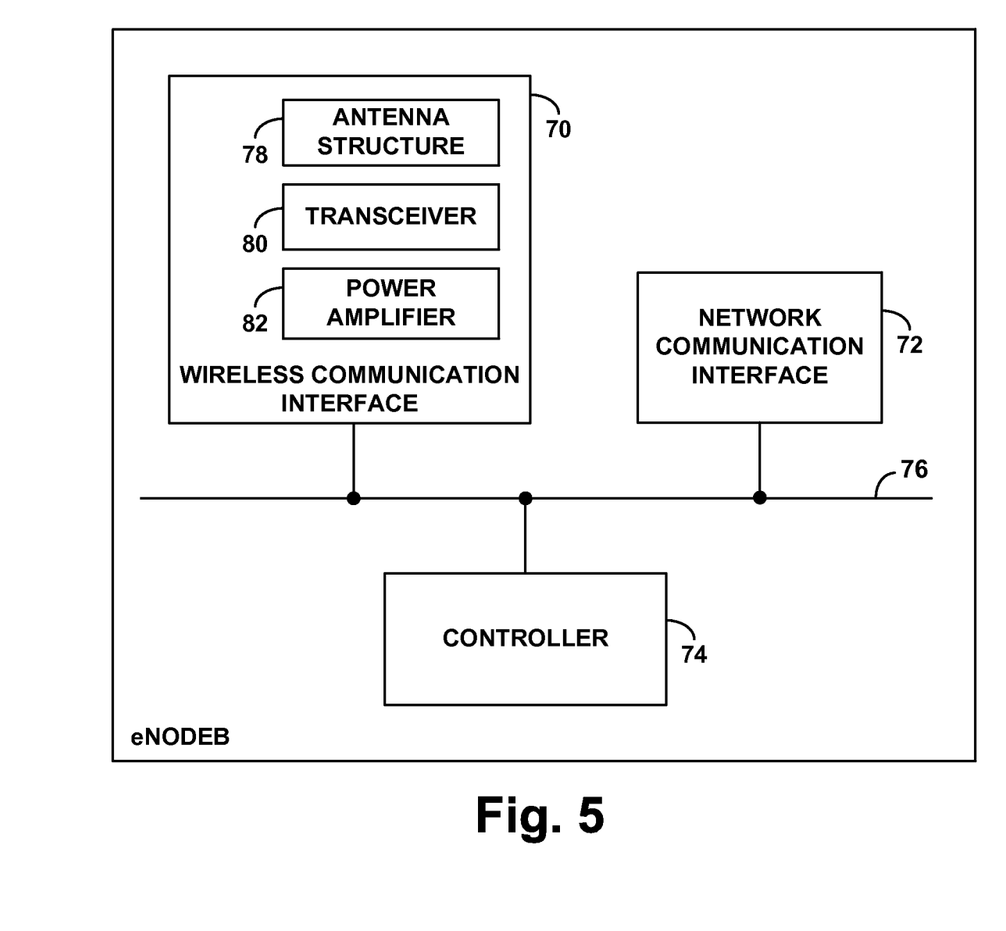
FIG. 5 is a simplified block diagram of an example base station operable in accordance with the disclosure.

Finally, FIG. 5 is a simplified block diagram of an example base station, such as an eNodeB (e.g., macro eNodeB, small cell, or other type of base station), showing some of the components that such a device may include in order to carry out these and other operations. As shown, the example base station includes a wireless communication interface 70, a network communication interface 72, and a controller 74, all of which could be integrated together in various ways or, as shown, interconnected with each other through a system bus, network, or other connection mechanism 76.

Wireless communication interface 70 includes an antenna structure (e.g., one or more antennas or antenna elements) 78, which could be tower mounted or provided in some other manner, configured to transmit and receive over the air interface, as well as a transceiver 80 and power amplifier 82, enabling the base station to serve UEs such as UE 16 over an air interface. Network communication interface 72 may then comprise one or more wired and/or wireless network interfaces (such as an Ethernet interface) through which the base station may transmit and receive data over a backhaul connection with SGW 20 as discussed above.

Controller 74, which may be integrated with wireless communication interface 70 or with one or more other components of the base station (or could be provided separate from the other base station components, possibly even in one or more other network entities), may then be configured to manage communication over the air interface, including managing communication between the base station and UE in accordance with the present disclosure. For instance, the controller may be configured to (i) make a first determination that a UE is capable of being served by the base station on a first RF carrier and is capable of being served by the base station on a second RF carrier, (ii) while the base station is serving a plurality of UEs, make a second determination that a load level on the first RF carrier is higher than a threshold load level, and (iii) based at least on the first determination and the second determination, limit allocation of resource blocks on the first RF carrier to the UE. Further, other features discussed above, including the features discussed in connection with FIGS. 2, 3, and 4, could be applied here as well.

Exemplary embodiments have been described above. Those skilled in the art will understand, however, that changes and modifications may be made to these embodiments without departing from the true scope and spirit of the invention. Other examples are possible as well.

What is claimed is:

1. A method operable by a base station, wherein the base station is configured to provide wireless communication service on a plurality of radio frequency (RF) carriers, each carrier defining a plurality of physical resource blocks for carrying data, the method comprising:
    serving, by the base station, a plurality of user equipment devices (UEs) including a first UE and a second UE;
    during the serving, detecting that a load level on a first RF carrier of the plurality of RF carriers remains higher than a threshold load level for at least a threshold amount of time;
    making a first determination that the first UE (i) is being served by the base station on the first RF carrier and (ii) is capable of being served by the base station on a second RF carrier of the plurality of RF carriers;
    making a second determination that the second UE (i) is being served by the base station on the first RF carrier and (ii) is incapable of being served by the base station on the second RF carrier;
    responsive to at least the detecting, the first determination, and the second determination, reducing a number of resource blocks on the first RF carrier that are available for allocation by the base station to the first UE; and
    serving, by the base station, the first UE on the first RF carrier using at most the reduced number of resource blocks available for allocation to the first UE.

2. The method of claim 1, wherein the second UE is capable of receiving downlink data from the base station on the second RF carrier, and wherein making the second determination that the second UE is incapable of being served by the base station on the second RF carrier comprises:
   determining that the second UE is incapable of providing uplink data to the base station on the second RF carrier.

3. The method of claim 2, wherein determining that the second UE is incapable of providing the uplink data is based on (i) a location of the second UE, (ii) a location of the base station, and (iii) a path loss associated with the second RF carrier.

4. The method of claim 1, wherein the base station is configured to provide the wireless communication service on at least two non-contiguous frequency bands, wherein the first RF carrier is in a first frequency band of the at least two non-contiguous frequency bands, and wherein the second RF carrier is in a second frequency band of the at least two non-contiguous frequency bands.

5. The method of claim 4, wherein making the second determination that the second UE is incapable of being served by the base station on the second RF carrier comprises:
   determining that the second UE does not include hardware configured for wireless communication over the second frequency band.

6. The method of claim 4, wherein making the second determination that the second UE is incapable of being served by the base station on the second RF carrier comprises:
   determining that the second UE is incapable of receiving inter-band carrier aggregation service that includes aggregation of a component carrier in the first frequency band with a component carrier in the second frequency band.

7. The method of claim 4, wherein making the second determination that the second UE is incapable of being served by the base station on the second RF carrier comprises:
   determining that the second UE (i) is capable of receiving carrier aggregation service that includes aggregation of component carriers in the first frequency band and (ii) is incapable of receiving carrier aggregation service that includes aggregation of component carriers in the second frequency band.

8. The method of claim 1, further comprising:
   making a decision that the base station should serve the second UE with carrier aggregation, wherein reducing the number of resource blocks on the first RF carrier that are available for allocation by the base station to the first UE is also responsive to the decision.

9. The method of claim 1, further comprising:
   serving, by the base station, the first UE with carrier aggregation;
   after the reducing the number of resource blocks on the first RF carrier that are available for allocation by the base station to the first UE, making a third determination that the base station allocated the reduced number of resource blocks on the first RF carrier to the first UE; and
   responsive to the third determination, preventing the base station from allocating additional resource blocks on the first RF carrier to the first UE for the carrier aggregation service until the load level on the first RF carrier remains lower than a given threshold load level for at least a given amount of time.

10. A method operable by a base station, wherein the base station is configured to provide wireless communication service on a plurality of radio frequency (RF) carriers, each carrier defining a plurality of physical resource blocks for carrying data, the method comprising:
   serving, by the base station, a plurality of user equipment devices (UEs);
   making a first determination that a UE (i) is capable of being served by the base station on a first RF carrier of the plurality of RF carriers and (ii) is capable of being served by the base station on a second RF carrier of the plurality of RF carriers;
   during the serving, making a second determination that a load level on the first RF carrier is higher than a first threshold load level;
   based at least on the first determination and the second determination, limiting a number of resource blocks available for allocation on the first RF carrier by the base station to the UE; and
   serving the UE on the first RF carrier using at most the limited number of resource blocks until the load level on the first RF carrier remains lower than a second threshold load level for at least a threshold amount of time.

11. The method of claim 10, further comprising:
   making a decision by the base station to begin allocating one or more resource blocks on at least one of the plurality of RF carriers to the UE, wherein the limiting the number of resource blocks available for allocation on the first RF carrier to the UE is also based on the decision.

12. The method of claim 10, wherein the limiting the number of resource blocks available for allocation on the first RF carrier to the UE comprises:
   preventing allocation of additional resource blocks on the first RF carrier by the base station to the UE until the load level on the first RF carrier remains lower than the second threshold load level for at least the threshold amount of time.

13. The method of claim 10, further comprising:
   making a third determination that another UE of the plurality of UEs (i) is capable of being served by the base station on the first RF carrier and (ii) is incapable of being served by the base station on the second RF carrier, wherein the limiting of the number of resource blocks is also based on the third determination.

14. The method of claim 10, wherein the base station is configured to provide the wireless communication service on at least two non-contiguous frequency bands, wherein the first RF carrier is in a first frequency band of the at least two non-contiguous frequency bands, and wherein the second RF carrier is in a second frequency band of the at least two non-contiguous frequency bands.

15. The method of claim 14, wherein making the first determination that the UE is capable of being served by the base station on the second RF carrier comprises:
   determining that the UE includes hardware configured for wireless communication over the second frequency band.

16. The method of claim 14, wherein making the first determination that the UE is capable of being served by the base station on the second RF carrier comprises:
   determining that the UE is capable of receiving inter-band carrier aggregation service that includes aggregation of a component carrier in the first frequency band with a component carrier in the second frequency band.

17. The method of claim 10, wherein making the first determination that the UE is capable of being served by the base station on the second RF carrier comprises:

determining that the UE (i) is capable of providing uplink data to the base station on the second RF carrier and (ii) is capable of receiving downlink data from the base station on the second RF carrier.

18. A method operable by a base station, wherein the base station is configured to provide wireless communication service on a plurality of radio frequency (RF) carriers, each carrier defining a plurality of physical resource blocks for carrying data, the method comprising:
serving, by the base station, a plurality of user equipment devices (UEs) including a first UE and a second UE;
during the serving, detecting that a load level on a first RF carrier of the plurality of RF carriers remains higher than a first threshold load level for at least a first threshold amount of time;
making a first determination that the first UE (i) is being served by the base station on the first RF carrier and (ii) is capable of being served by the base station on a second RF carrier of the plurality of RF carriers;
making a second determination that the second UE (i) is being served by the base station on the first RF carrier and (ii) is incapable of being served by the base station on the second RF carrier;
responsive to at least the first determination and the second determination, limiting a number of resource blocks available for allocation on the first RF carrier by the base station to the first UE; and
serving the first UE on the first RF carrier using at most the limited number of resource blocks until the load level on the first RF carrier remains lower than a second threshold load level for at least a second threshold amount of time.

19. The method of claim 18, wherein the limiting of the number of resource blocks on the first RF carrier comprises:
responsive to the base station allocating the limited number of resource blocks on the first RF carrier to the first UE, preventing allocation of additional resource blocks on the first RF carrier to the first UE until the load level on the first RF carrier remains lower than the second threshold load level for at least the second threshold amount of time.

20. The method of claim 18, further comprising:
modifying an air interface connection between the base station and the first UE according to the limited number of resource blocks on the first RF carrier that are available for allocation by the base station to the first UE.

* * * * *